(12) United States Patent
Zeng et al.

(10) Patent No.: US 12,199,501 B2
(45) Date of Patent: Jan. 14, 2025

(54) PULSE-BY-PULSE CURRENT LIMIT WITH SLOPE COMPENSATOR FOR INVERTERS

(71) Applicant: HDM Systems Corporation, Brighton, MA (US)

(72) Inventors: James Jin Xiong Zeng, Westwood, MA (US); Raymond W. Lei, Braintree, MA (US); David S. C. Liu, Newton, MA (US)

(73) Assignee: HDM SYSTEMS CORPORATION, Boston, MA (US)

( * ) Notice: Subject to any disclaimer, the term of this patent is extended or adjusted under 35 U.S.C. 154(b) by 245 days.

(21) Appl. No.: 17/989,422

(22) Filed: Nov. 17, 2022

(65) Prior Publication Data

US 2024/0171063 A1    May 23, 2024

(51) Int. Cl.
*H02M 7/49* (2007.01)
*H02M 1/00* (2006.01)
*H02M 1/32* (2007.01)

(52) U.S. Cl.
CPC ......... *H02M 1/325* (2021.05); *H02M 1/0009* (2021.05); *H02M 1/0025* (2021.05); *H02M 7/49* (2013.01)

(58) Field of Classification Search
CPC .. H02M 1/325; H02M 1/0009; H02M 1/0025; H02M 7/49
See application file for complete search history.

(56) References Cited

U.S. PATENT DOCUMENTS

| | | | |
|---|---|---|---|
| 9,806,607 B2 * | 10/2017 | Ranmuthu | H02M 1/08 |
| 10,910,954 B1 * | 2/2021 | Shah | H01R 24/60 |
| 2018/0054116 A1 * | 2/2018 | Ranmuthu | H02M 3/07 |

* cited by examiner

*Primary Examiner* — Adolf D Berhane
(74) *Attorney, Agent, or Firm* — WOMBLE BOND DICKINSON (US) LLP

(57) ABSTRACT

In an embodiment, during an overload or short circuit condition, a current limit circuit of an inverter is utilized in a pulse-by-pulse manner, which in turn causes the AC output of the inverter to operate in a hiccup mode (e.g., pulse-by-pulse based on and off dependent upon the output current) and automatically recover once the operating parameters (e.g., output current) are within the proper ranges. The pulse-by-pulse current limit circuit is configured to protect the switching circuits of the inverter from shorting or device failure during any peak operating voltage conditions by ensuring on/off timing accuracy of the inverter.

20 Claims, 10 Drawing Sheets

PULSE-BY-PULSE CURRENT LIMIT WITH SLOPE COMPENSATOR FOR INVERTERS

FIELD OF THE DISCLOSURE

Embodiments of the present disclosure relate generally to direct current (DC) to alternating current (AC) inverters. More particularly, embodiments of the disclosure relate to current limit circuit for DC/AC inverters.

BACKGROUND

A power inverter (simply referred to as an inverter) is a power electronic device or circuitry that changes direct current (DC) to alternating current (AC). Power inverters are primarily used in electrical power applications where high currents and voltages are present. An inverter is often used in a vehicle to convert a DC voltage from a battery of the vehicle into an AC voltage.

During the operations of an inverter, an output current may inadvertently surge to an undesirable level (e.g., overload or short circuit), which may cause damages to the AC load coupled to the output of the inverter, as well as the components of the inverter. A conventional approach to limit the current is to shut down the AC output of the inverter in response to an event of overload or short circuit condition. However, when the inverter is subjected to an overload or short circuit event, the AC output will shut down, which causes the inverter to go into a latch mode and requires manual restart of the inverter once the operating parameters are within the desired limits. Such a manual process requirement lacks flexibility and may cause the interruption of the inverter.

In addition, the DC input voltage may also surge to an undesirable level during the operations. Furthermore, the input DC input voltage may be coupled to the inverter with reversed polarity. Such input conditions may cause damages to the inverter. A conventional approach to provide input protection is to use a metal oxide variator (MOV) to suppress the surged voltage or load dump conditions. The reversed polarity is protected by blocking diodes on the DC input circuit. However, it requires external fuse to terminate the continuous flow of current. Such approach may cause overheat of the inverter for prolonged surged voltage. There has been a lack of efficient ways to provide the input protection.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1A:
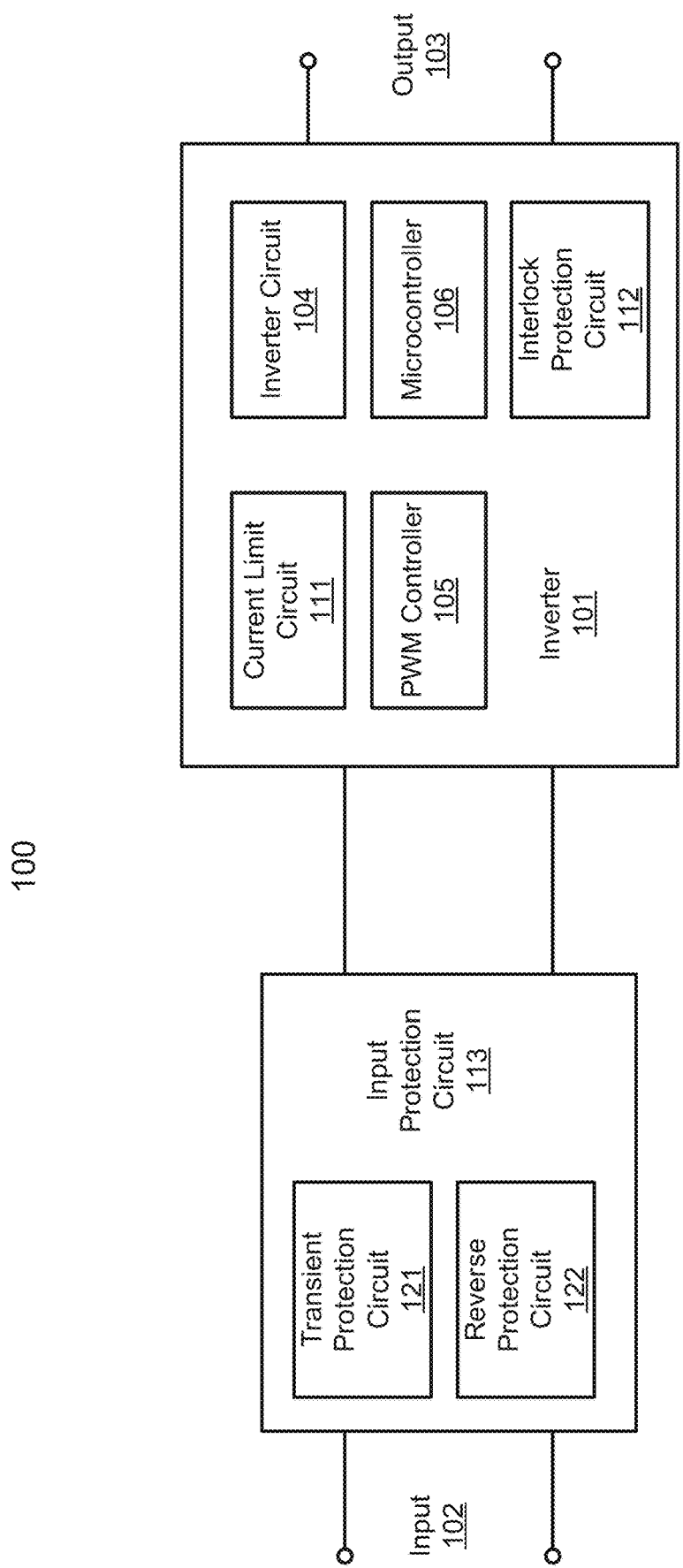
FIGS. 1A and 1B are block diagrams illustrating examples of inverter systems according to certain embodiments.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to an aspect of the disclosure, during an overload or short circuit condition, a current limit circuit of an inverter is utilized in a pulse-by-pulse manner, which in turn causes the AC output of the inverter to operate in a hiccup mode (e.g., pulse-by-pulse based on and off dependent upon the output current) and automatically recover once the operating parameters (e.g., output current) are within the proper ranges. The pulse-by-pulse current limit circuit is configured to protect the switching circuits of the inverter from shorting or device failure during any peak operating voltage conditions by ensuring on/off timing accuracy of the inverter.

According to some embodiments, an inverter includes an inverter circuit configured to convert a DC voltage to an AC voltage, a pulse width modulation (PWM) controller to generate a PWM signal, a driver circuit coupled to the PWM controller and the inverter circuit to drive the inverter based on the PWM signal, and a current limit circuit coupled the PWM controller, the driver circuit, and the inverter circuit to limit an output current of the inverter circuit to provide output overload and short circuit protection of the inverter circuit. The current limit circuit includes a current feedback circuit to generate a current feedback signal based on the PWM signal and the output current of the inverter circuit and a slope compensation circuit to generate a slope compensation signal based on the PWM signal and a predetermined current reference. The driver circuit is configured to turn on or turn off the inverter circuit based on the current feedback signal and the slope compensation signal, such that the output current of the inverter is limited.

In an embodiment, the current feedback circuit includes a current sense circuit coupled to an output of the inverter to sense the output current of the inverter and a ramp generator to generate a first ramp signal, wherein the current feedback signal is generated based on the sensed output current and the first ramp signal. The current feedback circuit further includes a first summation circuit to generate the current feedback signal by summing the sensed output current and the first ramp signal. In an embodiment, the slope compensation circuit includes a current reference configured to provide the predetermined current reference and a second ramp generator to generate a second ramp signal, wherein the slope compensation signal is generated based on the current reference and the second ramp signal.

In an embodiment, the slope compensation circuit further includes a second summation circuit to generate the slope compensation signal by summing the current reference and the second ramp signal. The current limit circuit further includes a comparator coupled to the current feedback circuit and the slope compensation circuit to compare the current feedback signal and the slope compensation signal. The driver circuit is configured to turn on or turn off the inverter circuit based on the comparison. An output of the slope compensation circuit is coupled to an inverted input of the comparator and an output of the current feedback circuit is coupled to a non-inverted input of the comparator. When the current feedback signal is higher than the slope compensation signal, the comparator generates a latch signal to shut down and latch at least one output of the driver circuit.

In an embodiment, the current limit circuit further includes an RS latch circuit coupled to between the comparator and the driver circuit, where the RS latch is configured to latch the driver circuit. An output of the comparator is connected to an S input of the RS latch circuit and utilized as a set signal to the RS latch circuit. The PWM signal is connected to an R input of the RS latch circuit, wherein the PWM signal is utilized as a reset signal to the RS latch circuit, when an R input signal turns high to reset latch. In an embodiment, the current limit circuit further includes an OR gate connected between the RS latch circuit and the driver circuit. A first input of the OR gate is coupled to an output of the RS latch circuit and a second input of the OR gate is to receive the PWM signal. The OR gate output is to drive the high side driver input.

According to some embodiments, an inverter system includes a first inverter to convert a direct current (DC) voltage to a first alternating current (AC) voltage and a second inverter to convert DC voltage to a second AC voltage. The first inverter and the second inverter are coupled to each other and configured to operate in an opposite phase, such that an output of the inverter system comprises a summation of the first AC voltage and the second AC voltage. Each of the first inverter and the second inverter may be implemented as the inverter described above.

According to some embodiments, a current limit circuit of an inverter includes a current feedback circuit to generate a current feedback signal based on a pulse width modulation (PWM) signal received from a PWM controller and an output current of an inverter circuit configured to convert a DC voltage to an AC voltage, a slope compensation circuit to generate a slope compensation signal based on the PWM signal and a predetermined current reference, and a driver circuit configured to turn on or turn off the inverter circuit based on the current feedback signal and the slope compensation signal. The current limit circuit is configured to limit the output current of the inverter circuit to provide output overload and short circuit protection of the inverter circuit.

In an embodiment, the current feedback circuit includes a current sense circuit coupled to an output of the inverter to sense the output current of the inverter and a ramp generator to generate a first ramp signal, wherein the current feedback signal is generated based on the sensed output current and the first ramp signal. In an embodiment, the current feedback circuit further includes a first summation circuit to generate the current feedback signal by summing the sensed output current and the first ramp signal.

In an embodiment, the slope compensation circuit includes a current reference configured to provide the predetermined current reference and a second ramp generator to generate a second ramp signal, where the slope compensation signal is generated based on the current reference and the second ramp signal. In an embodiment, the slope compensation circuit further includes a second summation circuit to generate the slope compensation signal by summing the current reference and the second ramp signal. In an embodiment, the current limit circuit further includes a comparator coupled to the current feedback circuit and the slope compensation circuit to compare the current feedback signal and the slope compensation signal, where the driver circuit is configured to turn on or turn off the inverter circuit based on the comparison.

According to another aspect of the disclosure, an input protection circuit is provided to protect the input of an inverter from being overloaded (e.g., voltage transient protection) and input reversed connection (e.g., input reverse polarity protection). The voltage transient protection utilizes Zener diodes, resistors, and a power MOSFET (metal-oxide-semiconductor field-effect transistor) to clamp down the DC spike or surged voltage at the input and prevent damage to the inverter's DC power and control section. The input reverse polarity protection utilizes blocking diodes and a switch to cut off reverse voltage and prevent damage to the DC power and control section of the inverter. Once the surge voltage and/or reverse voltage conditions have been removed, the inverter will automatically recover and power on. In addition, an AC output interlock protection circuit is in place to provide safety protection to the external load. The AC output interlock protection circuit utilizes interlock jumpers on the mating connectors, which when detected (or in response to a control signal), it will activate the internal power relays and enable the AC output voltage to the terminals coupled to the external load.

According to some embodiments, an inverter includes a positive input terminal and a negative input terminal to be coupled to a direct current (DC) voltage source to receive a DC voltage. The inverter further includes an inverter circuit having an input and an output, wherein the inverter is configured to receive the DC voltage at the input and convert the DC voltage to an alternating current (AC) voltage at the output. The inverter further includes a transient protection circuit coupled between the positive and negative input terminals and the input of the inverter circuit to protect the input of the inverter circuit in response to a surge of the DC voltage. In an embodiment, the transient protection circuit includes a field-effect transistor (FET) coupled across the input of the inverter circuit, a first Zener diode coupled between a positive input of the inverter circuit and the FET, and a second Zener diode coupled between a negative input of the inverter circuit and the FET.

In an embodiment, when the DC voltage exceeds a predetermined threshold, the FET is turned on to form a substantial short circuit across the input of the inverter circuit. The first Zener diode is configured to clamp a voltage across the positive input of the inverter circuit and a gate terminal of the FET within approximately 43 volts. The second Zener diode is configured to clamp a voltage across the gate terminal of the FET and the negative input of the inverter circuit within 18 volts to prevent overvoltage from occurring across the gate terminal of the FET. A cathode of the first Zener diode is coupled to a positive input of the inverter circuit and an anode of the first Zener diode is coupled to a gate terminal of the FET. A cathode of the second Zener diode is coupled to the gate terminal of the FET and an anode of the second Zener diode is coupled to a negative input of the inverter circuit. In an embodiment, the transient protection circuit further includes a first resistor coupled between the anode of the first Zener diode and the negative input of the inverter circuit, and a second resistor coupled between the anode of the first Zener diode and the gate terminal of the FET.

In an embodiment, the inverter further includes a reverse protection circuit coupled between the positive input terminal and the negative input terminal and the input of the inverter circuit to provide reversed voltage protection to the inverter circuit in response to detecting a reversal of the DC voltage applied to the input of the inverter circuit. The reverse protection circuit includes a first relay coupled between a DC source that provides the DC voltage and a positive input of the inverter circuit, and a first diode supply DC voltage to a DC/DC converter. In response to detecting the reversal of the DC voltage, the first diode is configured to block the reversed voltage to be supplied to other downstream components.

In an embodiment, the reverse protection circuit further includes a second relay coupled between the first input of the first relay and the negative input terminal. In response to detecting the reversal of the DC voltage, the second relay transitions into an open state, which in turn causes the first relay to be in the open state. In an embodiment, the reverse protection circuit further includes a second diode coupled across a second input of the second relay and a third diode coupled across the first input of the first relay. The second diode and the third diode are configured to reset the energy in the corresponding coils and cause the corresponding relays to transition into an open state, in response to detecting the reversed DC voltage. In an embodiment, the reverse protection circuit further includes a DC-to-DC (DC/DC) converter coupled between the first diode and the second relay to convert the DC voltage to a predetermined DC voltage, where the predetermined DC voltage is supplied to the second input of the second relay.

In an embodiment, the inverter further includes an interlock protection circuit coupled an output of the inverter circuit to provide output safety protection to an external load of the inverter circuit. The interlock protection circuit is configured to connect and disconnect the output of the inverter circuit to and from external load in response to a control signal. The interlock protection circuit includes a third relay coupled to a first output terminal of the inverter circuit, a fourth relay coupled to a second output terminal of the inverter circuit, and a microcontroller to generate and transmit the control signal to control the third relay and the fourth relay to connect with the external load.

In an embodiment, an input of the third relay is coupled to an input of the fourth relay, and the microcontroller is coupled the input of the third relay and the input of the fourth relay. The microcontroller is configured to receive an input control signal from an interlock jumper interface indicating that a jumper has been placed onto the interlock jumper interface or to receive the input control signal from a bus interface of an external bus associated with the external load.

According to some embodiments, an inverter system includes a first inverter to convert a direct current (DC) voltage to a first alternating current (AC) voltage, a second inverter to convert DC voltage to a second AC voltage. The first inverter and the second inverter are coupled to each other and configured to operate in an opposite phase, such that an output of the inverter system includes a summation of the first AC voltage and the second AC voltage. Each of the first inverter and the second inverter includes a positive input terminal and a negative input terminal to be coupled to a direct current (DC) voltage source to receive a DC voltage, and an inverter circuit having an input and an output, wherein the inverter is configured to receive the DC voltage at the input and convert the DC voltage to an alternating current (AC) voltage at the output. The inverter system further includes a transient protection circuit coupled between the positive and negative input terminals and the input of each inverter circuit to protect the input of the inverter circuit in response to a surge of the DC voltage. The transient protection circuit may be implemented as described above.

According to a further embodiment, a protection circuit for protecting an input of an inverter circuit includes a transient protection circuit coupled between a direct current (DC) voltage source and a positive input terminal and a negative input terminal of the inverter circuit to protect the inverter circuit, in response to a surge of a DC voltage received from the DC voltage source. The inverter circuit includes an input and an output, wherein the inverter circuit is configured to receive the DC voltage at the input and convert the DC voltage to an alternating current (AC) voltage at the output. The transient protection circuit includes a field-effect transistor (FET) coupled across the input of the inverter circuit, a first Zener diode coupled between a positive input of the inverter circuit and the FET, and a second Zener diode coupled between a negative input of the inverter circuit and the gate of the FET. The protection circuit further includes a reverse protection circuit coupled between the positive input terminal and the negative input terminal and the input of the inverter circuit to provide reversed voltage protection to the inverter circuit in response to detecting a reversal of the DC voltage applied to the input of the inverter circuit.

Figure 1B:
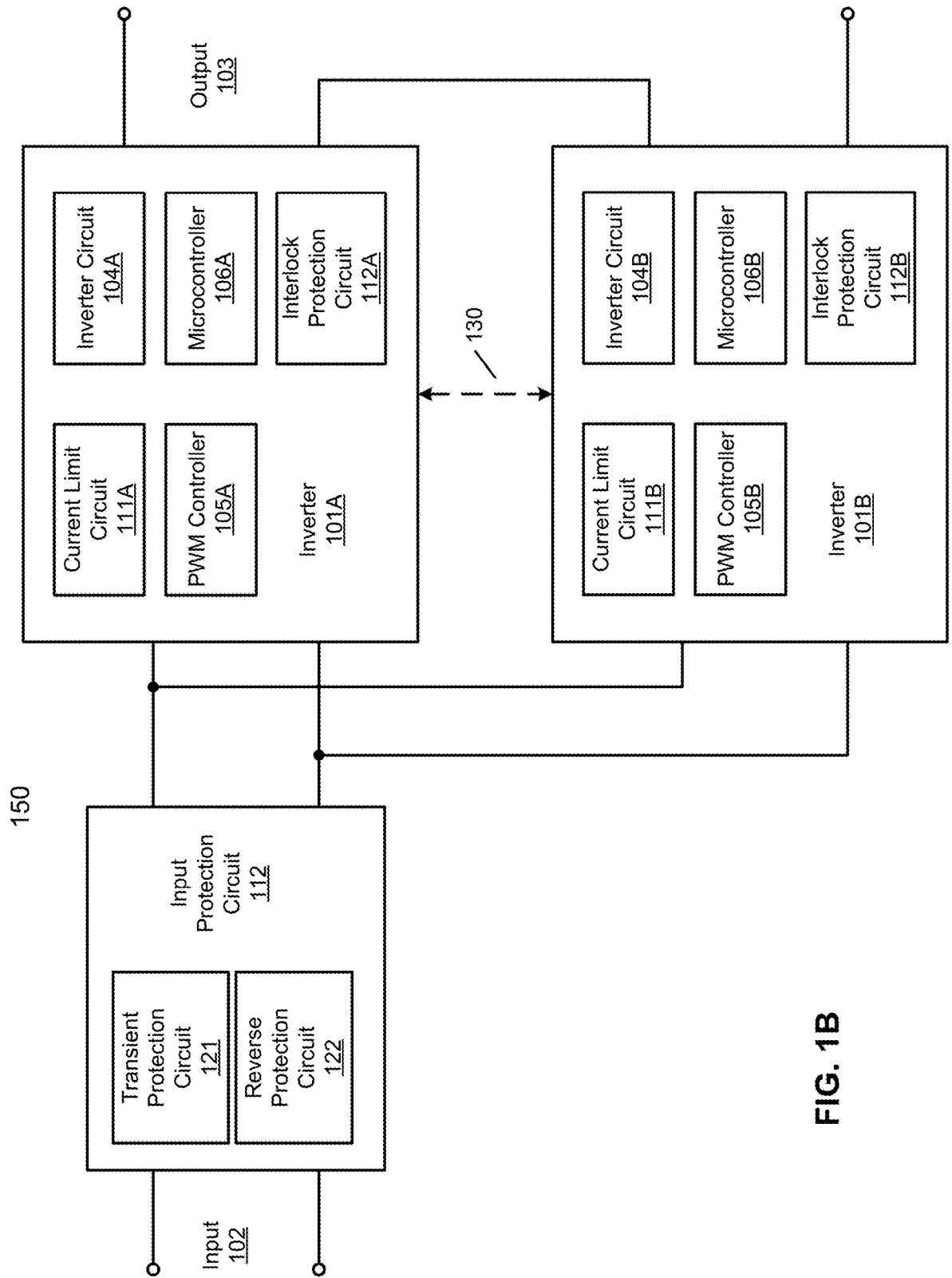

FIGS. 1A and 1B are block diagrams illustrating an example of an inverter system according to some embodiments. Referring to FIG. 1A, inverter system 100 includes an inverter 101 that is configured to convert a DC voltage received from its input 102 to an AC voltage at its output 103. Inverter 102 includes inverter circuit 104, a PWM controller 105, and a microcontroller (MC) 106. Inverter circuit 104 can be any kind of DC-to-AC converters. PWM controller 105, which may be implemented as part of inverter circuit 104, is configured to generate PWM signals with proper duty cycles and switching frequencies to drive inverter circuit 104. Microcontroller 106 may be configured to perform any management or housekeeping actions, including sensing certain voltages or currents at different points within the inverter 101, activate or configure certain protection actions such as current limiting, input protection, and output protection. Microcontroller 106 may further communicate with a counterpart microcontroller of another inverter, such as, for example, via a communication link 130 (e.g., RS-485 link) of FIG. 1B.

Inverter 101 further includes a current limit circuit 111 and interlock protection circuit 112. In an embodiment, current limit circuit 111 is configured to provide pulse-by-pulse current limit protection to inverter circuit 104, such that inverter circuit 104 operates in a hiccup mode in response to a surge in output current (e.g., overload or short circuit condition). Interlock protection circuit 112 is configured to provide safety protection by locking and unlocking the output of inverter circuit 104 to an external load.

In an embodiment, inverter system 101 further includes an input protection circuit 113 to provide protection at the input of inverter 101. Input protection circuit 113 may be integrated within inverter 101 as part of its input frontend circuit. Input protection circuit 113 includes a transient protection circuit 121 and a reverse protection circuit 112. Transient protection circuit 121 is configured to provide input voltage surge protection by clamping the input voltage within a predetermined range, so that the components of inverter 101 is protected. Reverse protection circuit 122 is configured to provide input reverse protection at the input of inverter 101, such that the components of inverter 101 will not be damaged when the polarity of the DC input is reversed.

Note that although only one inverter is shown, more inverters can be shared with input protection circuit 113, for example, as shown in FIG. 1B. Referring to FIG. 1B, in this example, inverter system 150 includes two inverters 101A and 101B. Both inverters 101A and 101B are coupled to input protection circuit 113, where input protection circuit 113 are shared to provide input protection to both inverters 101A and 101B. In an embodiment, one of the output terminals of inverter 101A is connected to one of the output terminals of inverter 101B. Inverters 101A and 101B are configured to operate in an opposite phase (e.g., 180 degrees apart), such that the remaining output terminals are configured to provide a sum of the AC outputs of inverters 101A and 101B. Alternatively, input protection circuit 112 may be integrated in each of inverters 101A and 101B. That is, each of inventers 101A and 101B includes input protection circuit 112.

Figure 2:
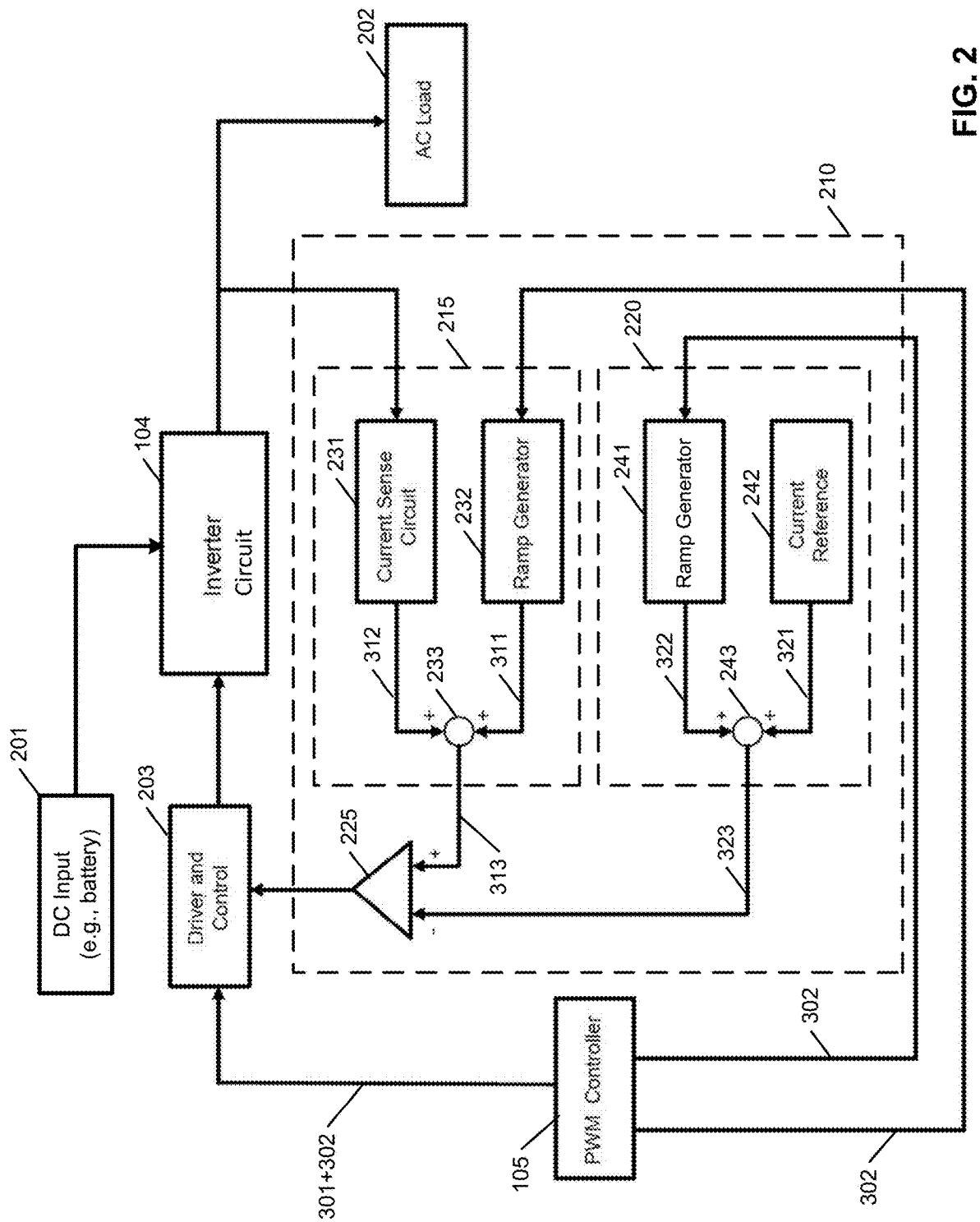
FIG. 2 is a block diagram illustrating an example of an inverter according to one embodiment.

FIG. 2 is a block diagram illustrating an example of an inverter according to one embodiment. For example, inverter 200 may represent any of inverters as shown in FIGS. 1A and 1B. Referring to FIG. 2, inverter 200 includes, amongst others, PWM controller 105, driver circuit 203, and inverter circuit 104 to convert a DC input voltage received from DC input 201 into an AC output voltage to be supplied to external AC load 202. PWM controller 105 is configured to generate a PWM signal to control driver circuit 203, which in turn drives inverter circuit 104 to perform DC/AC conversion.

In an embodiment, inverter 200 further includes a current limit circuit 210 coupled to the output of inverter circuit 104 and PWM controller 105. Current limit circuit 210 is configured to limit the output current of inverter circuit 104 by controlling driver circuit 203 to turn on or turn off inverter circuit 104. Current limit circuit 210 is coupled to the PWM controller 105, the driver circuit 203, and the inverter circuit 104 to limit an output current of the inverter circuit 104 to provide output overload and short circuit protection of the inverter circuit 104.

Figure 3A:
FIGS. 3A and 3B are signal waveforms of certain signals of an inverter according to certain embodiments.

In an embodiment, referring to FIGS. 2 and 3A, current limit circuit 210 includes a current feedback circuit 215 and a slope compensation circuit 220. In an embodiment, the current feedback circuit 215 includes a current sense circuit 231 coupled to an output of the inverter circuit 104 to sense the output current of the inverter circuit 104 and a ramp generator or ramp generation circuit 232 to generate a first ramp signal 311. The first ramp signal 311 is generated based on a PWM signal 302 provided by PWM controller 105. The current feedback signal 313 is generated based on the sensed output current 312 and the first ramp signal 311. The current feedback circuit 215 further includes a first summation circuit 233 to generate the current feedback signal 313 by summing the sensed output current 312 and the first ramp signal 311.

Figure 3B:
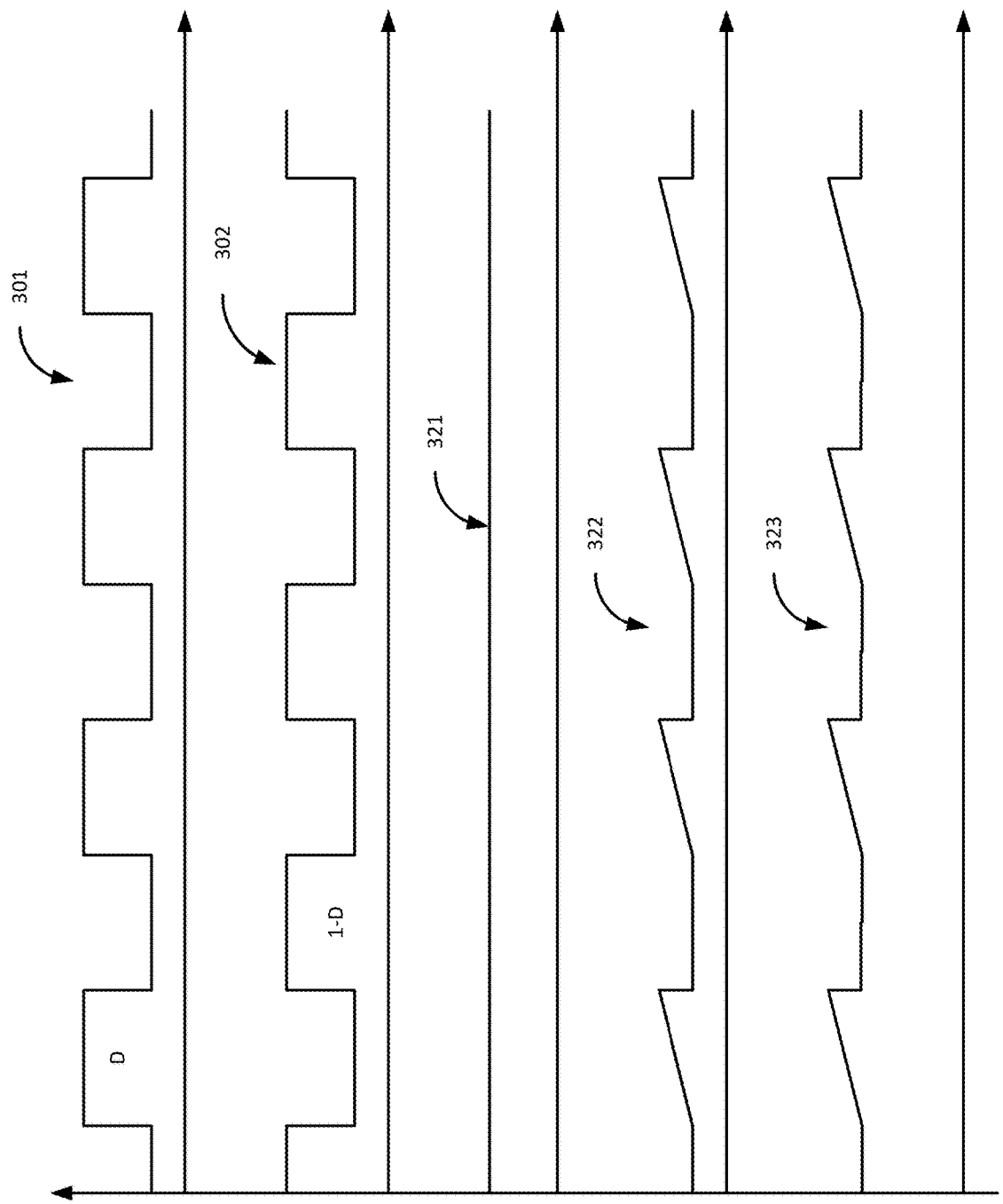

In an embodiment, referring to FIGS. 2 and 3B, the slope compensation circuit 220 includes a current reference 242 configured to provide the predetermined current reference 321 and a second ramp generator 241 to generate a second ramp signal 322. The second ramp signal 322 is generated based on a PWM signal 302 provided by PWM controller 105. The slope compensation signal 323 is generated based on the current reference 321 and the second ramp signal 322.

In an embodiment, the slope compensation circuit 220 further includes a second summation circuit 243 to generate the slope compensation signal 323 by summing the current reference 321 and the second ramp signal 322. The current limit circuit 210 further includes a comparator 225 coupled to the current feedback circuit 215 and the slope compensation circuit 220 to compare the current feedback signal 313 and the slope compensation signal 323, where signal 323 is utilized as a reference signal for the comparison. The driver circuit 203 is configured to turn on or turn off the inverter circuit 104 based on the comparison provided by comparator 225. PWM controller 105 provides both PWM signals 301 and 302 to driver circuit 203, where PWM signal 301 and PWM signal 302 are in an opposite phase during a switching cycle.

In an embodiment, referring to FIGS. 2 and 3A-3B, an output of the slope compensation circuit 220 is coupled to an inverted input (e.g., positive input) of the comparator 225 and an output of the current feedback circuit 215 is coupled to a non-inverted input (e.g., negative input) of the comparator 225. When the current feedback signal is higher than the slope compensation signal, for example, during a particular switching cycle, comparator 225 generates a logical high signal, which shuts down and latches all the outputs of the driver circuit 203, which in turn shuts down and latches the output of inverter circuit 104, the PWM 302 high signal reset the latch and make inverter output into hiccup mode. If signal 323 is higher than signal 313, comparator 225 produces a logical low signal, which will reset the driver circuit 203 to enable inverter circuit 104 back to a normal operating mode.

Thus, inverter circuit 104 is controlled on a cycle-by-cycle (or pulse-by-pulse) basis. In one switching cycle, inverter circuit 104 may be shut down due to high output current as a result of comparison at comparator 225, and in next switching cycle, dependent upon the output current situation, inverter circuit 104 may continuously be in hiccup mode (e.g., latched due to signal 313 higher than signal 323) PWM controller 302 signal high reset driver 203 latch or be reset to be back to the normal operating mode (e.g., enabling output of inverter circuit 104 due to signal 313 lower than signal 323).

Figure 4:
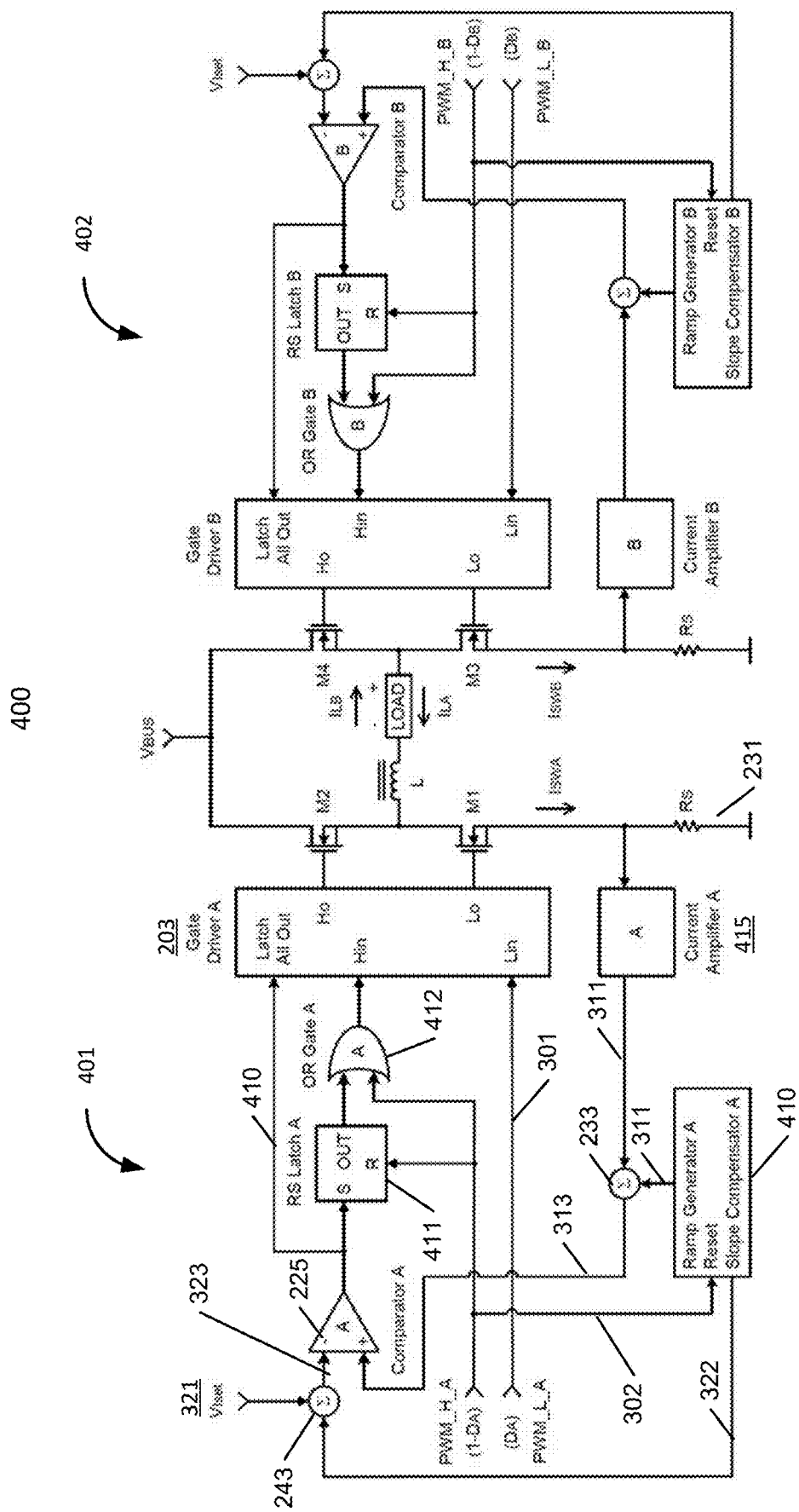
FIG. 4 is a schematic diagram illustrating an example of an inverter according to one embodiment.

FIG. 4 is a block diagram illustrating an example of an inverter system according to another embodiment. Inverter 400 may present inverter system 150 of FIG. 1B. Referring to FIG. 4, in this example, inverter 400 includes inverter H-bridge left side A 401 and inverter H-bridge right side B 402 that operate in a similar operation, which in conjunction to produce a summation of the output of invertor 400. FIG. 4 is a H-bridge of an inverter 400, four FETs M1, M2, M3 and M4 driver controlled by PWM control from microcontroller and generate an AC output.

In an embodiment, inverter H-bridge left side 401 includes, amongst others, circuit 410 that represents a combination of ramp generator 232 and ramp generator 241 of FIG. 2. Circuit 410 generates ramp signal 311 based on PWM signal 302 as a reset signal. Current sense circuit 231, in this example, a current sense resistor Rs provides output current from inverter 401 represented by power FETs M1 and M2. The combination of ramp signal 311 and sensed current signal 312 produces current feedback signal 313. Current feedback signal 313 is fed to a positive input of comparator 225. On the other hand, circuit 410 produces ramp signal 322 based on PWM signal 302. Ramp signal 322 and current reference signal 321 are combined to produce slope compensation signal 323. Slope compensation signal 323 is fed to the negative input of comparator 225. When signal 313 is higher than signal 323, comparator 225 produces an output signal 410 as a logical high signal, and when signal 313 is lower than signal 323, comparator 225 produces the output signal 410 as a logical low signal.

In an embodiment, an RS latch circuit 411 is coupled to between the comparator 225 and the driver circuit 203. The RS latch circuit 411 is configured to latch the driver circuit 203. An output of the comparator 225 is connected to a set input (S input) of the RS latch circuit 411 and utilized as a set signal to the RS latch circuit 411. The PWM signal 302 is connected to a reset input (R input) of the RS latch circuit 411. The PWM signal 302 is utilized as a reset signal to the RS latch circuit 411. When the PWM signal 302 high, it resets the latch of driver and control 203. In an embodiment, an OR gate 412 is connected between the RS latch circuit 411 and the driver circuit 203. A first input of the OR gate 412 is coupled to an output of the RS latch circuit 411 and a second input of the OR gate 412 is to receive the PWM signal 302. The output of OR gate 412 is used to control a high side gate terminal of FET M2, while PWM signal 301 is used to control a low side gate terminal of FET M1. At any point in time, only one of M1 and M2 is turned on.

In an embodiment, when signal 313 (representing output current) is higher than signal 323 (representing a reference signal), comparator 225 produces signal 410. Signal 410 with logical high is provided to a latch all output of driver circuit 203, which turns off and latches M1 and M2. Signal 410 is also fed to the set input of RS latch circuit 411. Signal 410 with logical high while reset input receives a logical low signal from PWM signal 302 causes the output of RS latch circuit 411 to produce a logical low signal. Both the output of RS latch circuit 411 and PWM signal 302 are fed to OR gate 412 to control the high side gate terminal of M2.

On the next switching cycle (e.g., next pulse), if signal 313 is lower than signal 323 (e.g., output current is within a desirable range), comparator 225 produces a logical low signal 410, which in turn clears or releases the latch all out state in driver circuit 203, and M1 and M2 are enabled. In this scenario, PWM signal 301 is fed to Lin of driver circuit 203 to control M1, while PWM signal 302 and output of RS latch signal into OR gate inputs, output of OR is fed to Hin of driver circuit 203 to control M2. On the other hand, if signal 313 continues to be higher than signal 323, signal 410 remains logically high, which in turn continue latching and turning off both M1 and M2 of driver circuit 203. For every switching cycle when the PWM signal 302 is high, it will reset the latch of driver and control 203 that created by the RS latch circuit. The OR gate circuit is needed to combine the PWM signal 302 and latch signal to control high side FETs.

Figure 5A:
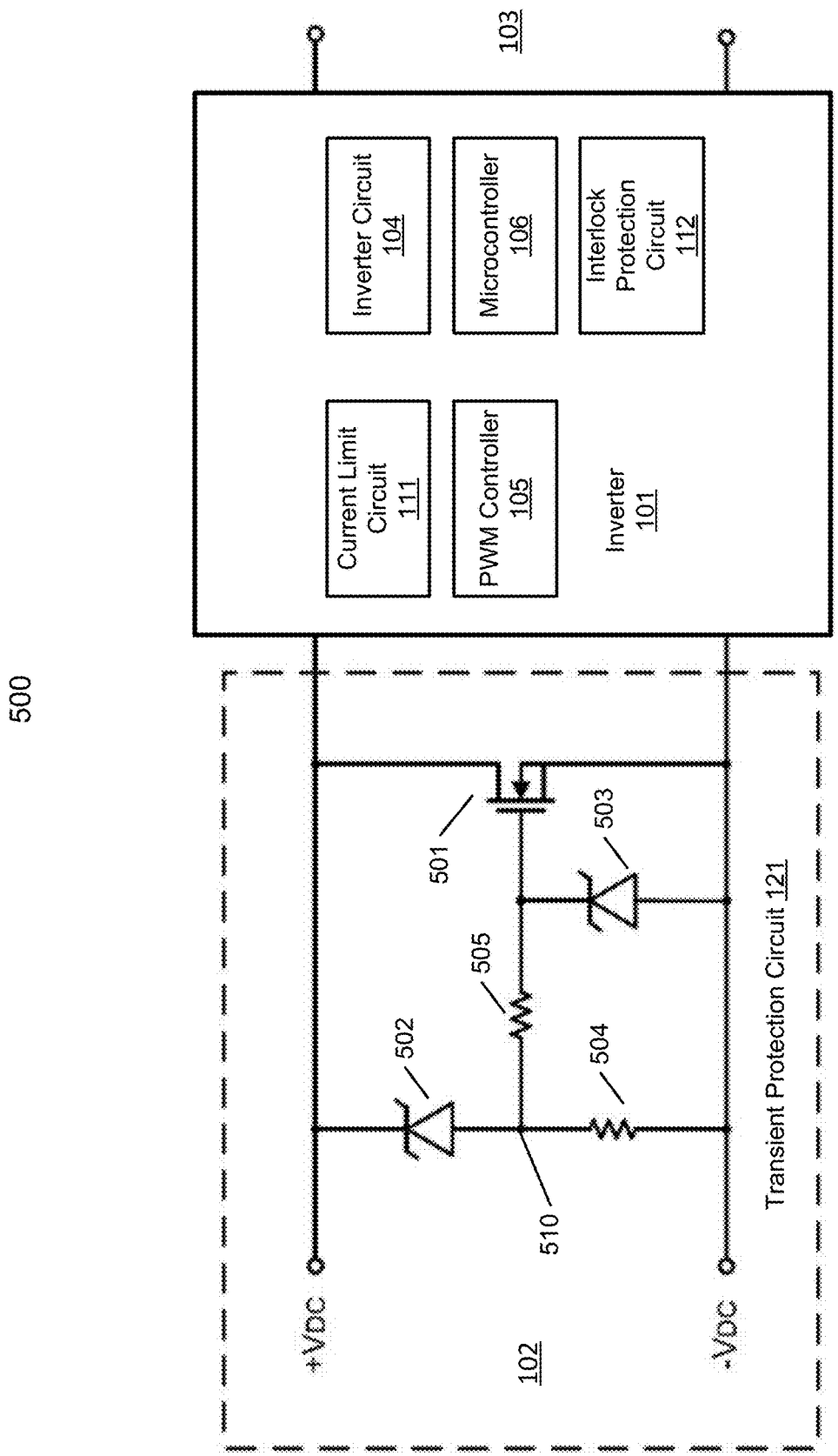
FIGS. 5A and 5B are block diagrams illustrating examples of an inverter system according to an embodiment.

FIG. 5A is a schematic diagram illustrating an example of an inverter system according to one embodiment. For example, inverter system 500 may be implemented as part of inverter systems of FIGS. 1A and 1B. Referring to FIG. 5A, inverter system 500 includes a transient protection circuit 121 coupled to the input of inverter 101 to provide input voltage surge protection on the input of inverter 101 to reduce the possibility of damaging at least the input components of inverter 101. In an embodiment, transient protection circuit 121 includes a FET 501 coupled across the input of inverter 101.

In this example, the drain terminal of FET 501 is connected to a positive input terminal +Vdc of inverter 101 and the source terminal of FET 501 is connected to a negative input terminal −Vdc of inverter 101. FET 501 may be a power MOSFET that when turned on, can drain a large amount of current from +Vdc to −Vdc, bypassing the input of inverter 101. As a result, the voltage across +Vdc and −Vdc can be significantly reduced, which in turn protects the input of inverter 101.

Transient protection circuit 121 further includes a first Zener diode 502, a second Zener diode 503, a first resistor 504, and a second resistor 505. A cathode of Zener diode 502 is coupled to the +Vdc terminal of inverter 101 and an anode of Zener diode 502 is coupled to a gate terminal of FET 501 via resistor 505. One end of resistor 504 is coupled to the −Vdc of inverter 101 and the other end of resistor 504 is coupled to the anode of Zener diode 502 and resistor 505 to form a node 510.

In an embodiment, Zener diode 502 is configured to clamp the voltage across Zener diode 502 approximately 43 volts. Zener diode 503 is configured to clamp the voltage across Zener diode 503 within 18 volts to protect the gate terminal to source terminal of FET 501. As a result, the voltage across +Vdc and −Vdc is maintained within 50 volts. In an embodiment, resistor 504 has a resistance value approximately 2 kiloohms while resistor 505 has a resistance value approximately 100 ohms.

Figure 5B:
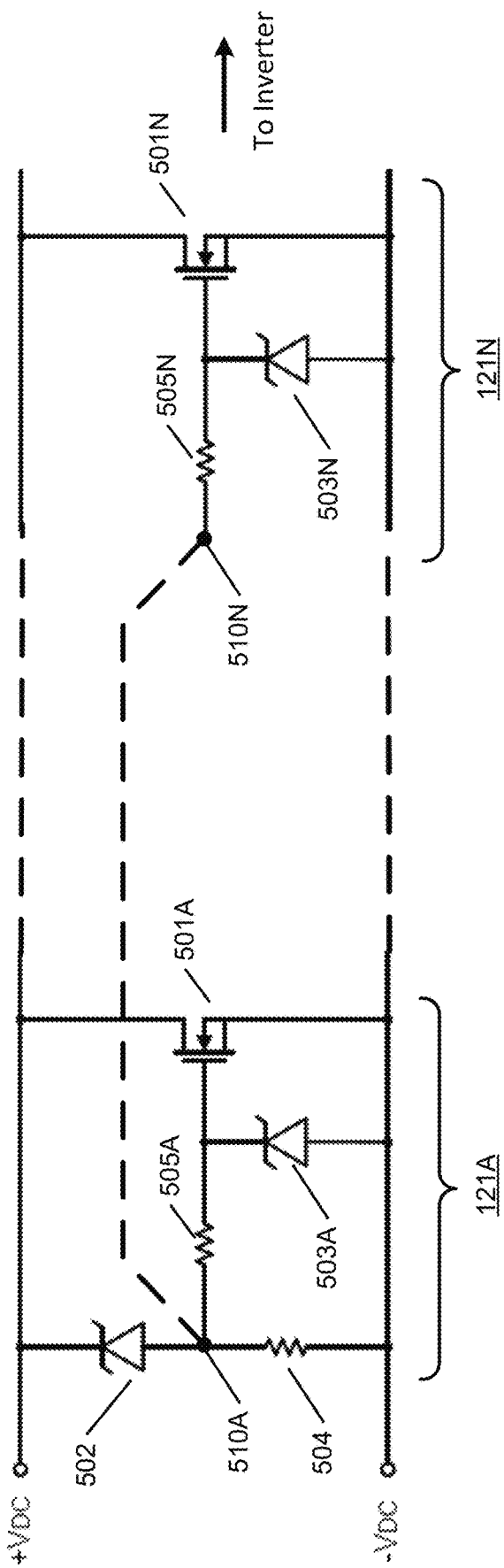

In an embodiment, when the input voltage across +Vdc and −Vdc surges, transient protection circuit 121 is configured clamp the input voltage within 50 volts. In the meanwhile, the surge voltage causes the voltage at the gate of FET 501 to increase, which in turn turns on FET 501. FET 501, in this example, an N-channel FET, when turned on, causes a short circuit condition across the drain terminal and the source terminal of the FET to drain a large current from +Vdc to −Vdc, bypassing the inverter 101 for protection purposes. Note that multiple of transient protection circuit 121 can be utilized in parallel to handle a larger current surge as shown in FIG. 5B. Also note that transient protection circuit 121 may be implemented as part of inverter 101.

Figure 6:
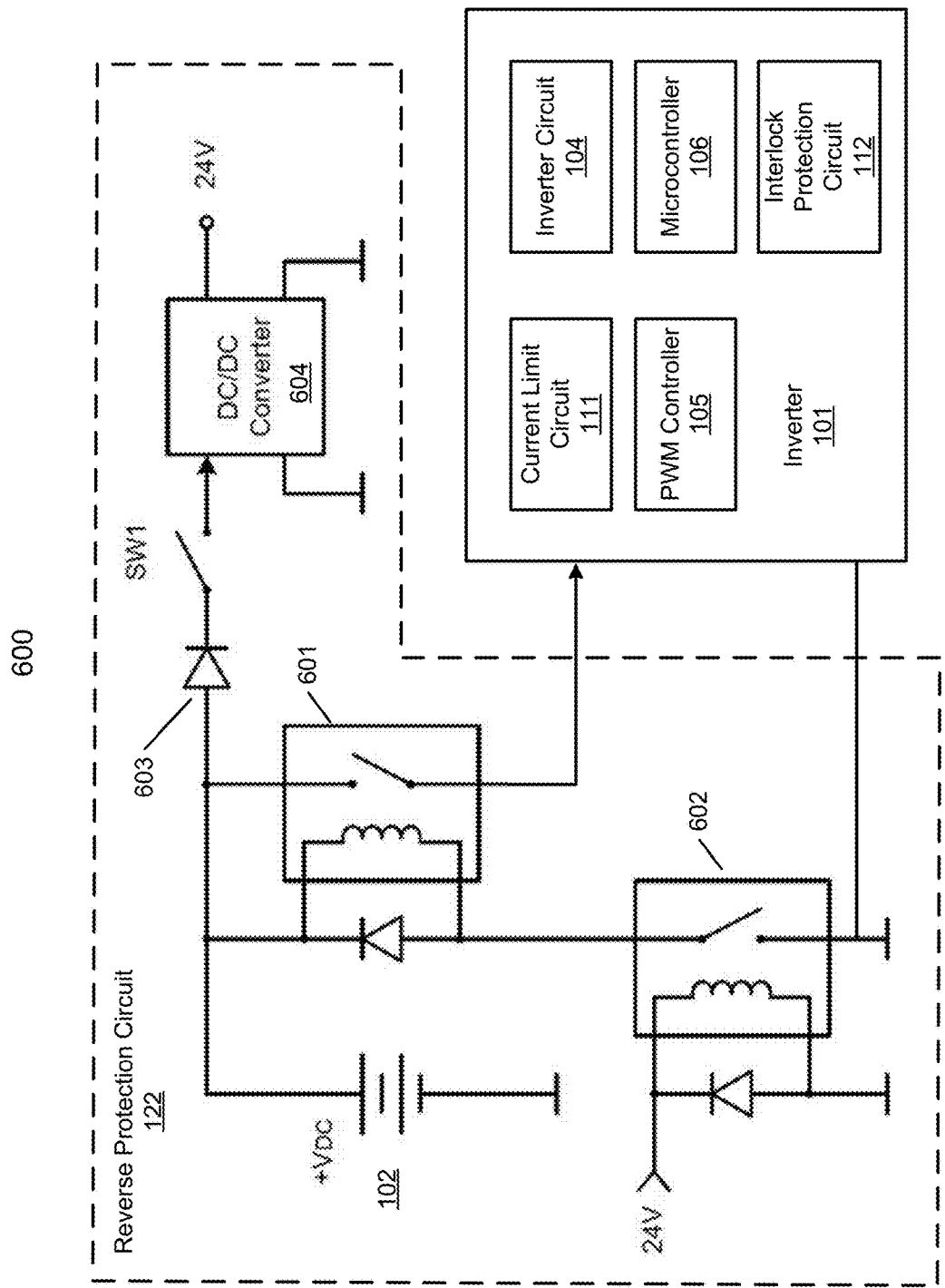
FIG. 6 is a block diagram illustrating an example of an inverter system according to another embodiment.

FIG. 6 is a schematic diagram illustrating an inverter system according to another embodiment. Inverter system 600 may be implemented as part of inverter systems as shown in FIGS. 1A and 1B. Referring to FIG. 6, inverter system 600 includes a reverse protection circuit 122 coupled between DC input 102 and the input of inverter 101. In an embodiment, reverse protection circuit 122 includes a first relay 601 coupled between DC input 102 and the input of inverter 101. Reverse protection circuit 122 further includes a second relay 602 coupled to the first relay 601, where the second relay 602 is configured to control (e.g., closing or opening) first relay 601 based on the polarity of a DC voltage applied to the DC input 102.

In an embodiment, each of relays 601-602 is a normally open relay. That is, the contact terminals of a relay are normally open or in an open state when the relay is not activated (e.g., no current flowing through the input terminals of the relay, no voltage supply to the coil of relay). When a current flows through the input terminals of the relay (e.g., activated), the contact terminals are closed or in a close state to allow a current to flow through the contact terminals.

In an embodiment, one of the input terminals of relay 601 is coupled to the positive terminal of input 102. The other input terminal of relay 601 is coupled to one of the contact terminals of relay 602. The other contact terminal of relay 602 is coupled to the negative terminal of input 102, in this example, the ground.

In an embodiment, reverse protection circuit 122 further includes a first diode 603 and a DC/DC converter 604 coupled between input 102 and relay 602. The anode of diode 603 is coupled to the positive input of input 102 while the cathode of diode 603 is coupled to the input of DC/DC converter 604 via switch SW1. Switch SW1 may be a manual switch to allow a user to manually cut off the power to DC/DC converter and then relay 602. In a normally operation (e.g., proper polarity), a current is allowed to flow through diode 603 to provide power to DC/DC converter 604. Dependent upon the input voltage supplied to input 102, DC/DC converter 604 is utilized to convert an input voltage received from input 102 to a predetermined voltage, in this example, approximate 24 volts.

In the normal operation, the input terminals of relay 602 receive power from DC/DC converter 604 and a current flows through the electromagnetic coil of relay 602, which in turn activates relay 602. As the contact terminals of relay 602 are closed or in a close state. When relay 602 is activated, a current can flows from input 102, through the electromagnetic coil of relay 601, to the contact terminals of relay 602. As a result, relay 601 is activated, which causes the contact terminals of relay 601 to be closed. The input voltage received from input 102 can then be supplied to the input of inverter 101.

When the input voltage is reversed (e.g., opposite polarity), diode 603 is configured to block the reversed input voltage from being supplied to relay 602. When the reversed input is detected, there is no current flowing through the electromagnetic coil of relay 602, which deactivates and causes relay 602 to be in an inactive state (e.g., open state). Since relay 602 open and no current flowing through the coil of relay 601, relay 601 is deactivated as a result and relay 601 is in an open state. Therefore, no current flows from input 102 to inverter 101, which provides protection to at least the input components of inverter 101. Note that transient protection circuit 121 and reverse protection circuit 122 can be coupled to the input of inverter 101 in parallel concurrently.

Figure 7:
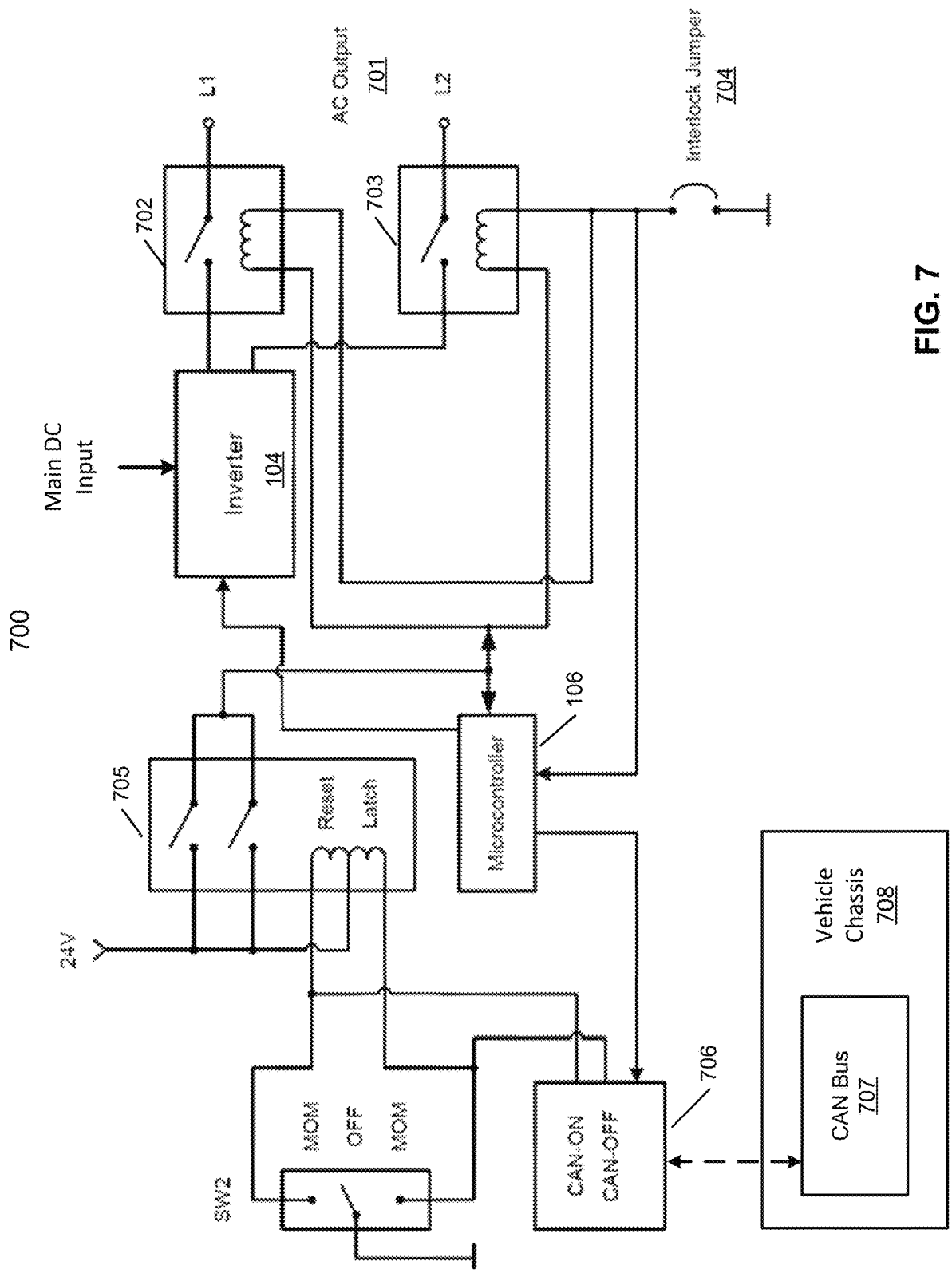
FIG. 7 is a block diagram illustrating an example of an inverter system according to another embodiment.

FIG. 7 is a schematic diagram illustrating an example of an inverter according to an embodiment. Referring to FIG. 7, the inverter 700 includes an interlock protection circuit coupled an output of the inverter circuit 104 to provide output safety protection to an external load of the inverter circuit 104. The interlock protection circuit is configured to connect and disconnect the output of the inverter circuit 104 to and from external load at the AC output 701 in response to a control signal. The interlock protection circuit includes a third relay 702 coupled to a first output terminal of the inverter circuit 104, a fourth relay 703 coupled to a second output terminal of the inverter circuit 104, and a microcontroller 106 to generate and transmit the control signal to control the third relay 702 and the fourth relay 703 to connect with the external load.

In an embodiment, an input of the third relay 702 is coupled to an input of the fourth relay 703, and the microcontroller 106 is coupled the input of the third relay 702 and the input of the fourth relay 703. The microcontroller 106 is configured to receive an input control signal from an interlock jumper interface 704 indicating that a jumper has been placed onto the interlock jumper interface 704 or to receive the input control signal from a bus interface 705 of an external bus associated with the external load.

In an embodiment, jumper socket 704 is used for safety purpose. In order to enable the output of inverter circuit 104, a jumper has to be placed into the jumper socket 704. In this example, one end of jumper socket 704 is coupled the ground and the other end is coupled to input terminals of relays 702 and 703. Without the jumper placed on socket 704, there will be no current flowing through the input terminals of relays 702 and 703, and thus relays 702 and 703 are in an open state and no current flowing through the contacts of relays 702-703. As a result, there is no AC output at the output 701.

When a jumper is placed on the jumper socket 704, microcontroller 106 is configured to control relays 702-703 to enable or disable delivery of AC output 701, for example, based on the setting of switch SW2. Switch SW2 can be utilized by a user to enable or disable the output of inverter circuit 104. When switch SW2 is switched on, a DC current flows through the input, i.e., the electromagnetic coil, of relay 705, which in turn activate the relay. The contact terminals of relay 705 are in a close state to allow a DC current flowing through the input terminals of relays 702 and 703 to enable the output of inverter circuit 104. When switch SW2 is off, no current flows through the input of relay 705, and thus no current flows through the inputs of relays 702 and 703. As a result, the output of inverter circuit 104 is disabled. In another embodiment, relay 705 can also be activated or deactivated based on a control signal received from a bus interface 706. The bus interface 706 can be coupled to an external bus such as a CAN (controller area network) bus 707 of a vehicle chassis 708 of a vehicle.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. An inverter, comprising:
   an inverter circuit configured to convert a DC voltage to an AC voltage;
   a pulse width modulation (PWM) controller to generate a PWM signal;
   a driver circuit coupled to the PWM controller and the inverter circuit to drive the inverter based on the PWM signal; and
   a current limit circuit coupled the PWM controller, the driver circuit, and the inverter circuit to limit an output current of the inverter circuit to provide output overload and short circuit protection of the inverter circuit, wherein the current limit circuit comprises:
   a current feedback circuit to generate a current feedback signal based on the PWM signal and the output current of the inverter circuit, and
   a slope compensation circuit to generate a slope compensation signal based on the PWM signal and a predetermined current reference, wherein the driver circuit is configured to turn on or turn off the inverter circuit based on the current feedback signal and the slope compensation signal, such that the output current of the inverter is limited.

2. The inverter of claim 1, wherein the current feedback circuit comprises:
   a current sense circuit coupled to an output of the inverter to sense the output current of the inverter; and
   a ramp generator to generate a first ramp signal, wherein the current feedback signal is generated based on the sensed output current and the first ramp signal.

3. The inverter of claim 2, wherein the current feedback circuit further comprises a first summation circuit to generate the current feedback signal by summing the sensed output current and the first ramp signal.

4. The inverter of claim 1, wherein the slope compensation circuit comprises:

a current reference configured to provide the predetermined current reference; and a second ramp generator to generate a second ramp signal, wherein the slope compensation signal is generated based on the current reference and the second ramp signal.

5. The inverter of claim 4, wherein the slope compensation circuit further comprises a second summation circuit to generate the slope compensation signal by summing the current reference and the second ramp signal.

6. The inverter of claim 1, wherein the current limit circuit further comprises a comparator coupled to the current feedback circuit and the slope compensation circuit to compare the current feedback signal and the slope compensation signal, wherein the driver circuit is configured to turn on or turn off the inverter circuit based on the comparison.

7. The inverter of claim 6, wherein an output of the slope compensation circuit is coupled to an inverted input of the comparator and an output of the current feedback circuit is coupled to a non-inverted input of the comparator.

8. The inverter of claim 6, wherein when the current feedback signal is higher than the slope compensation signal, the comparator generates a latch signal to shut down and latch at least one output of the driver circuit.

9. The inverter of claim 8, wherein the current limit circuit further comprises an RS latch circuit coupled to between the comparator and the driver circuit, wherein the RS latch is configured to latch the driver circuit.

10. The inverter of claim 9, wherein an output of the comparator is connected to an S input of the RS latch circuit and utilized as a set signal to the RS latch circuit.

11. The inverter of claim 10, wherein the PWM signal is connected to an R input of the RS latch circuit, wherein the PWM signal is utilized as a reset signal to the RS latch circuit.

12. The inverter of claim 9, wherein the current limit circuit further comprises an OR gate connected between the RS latch circuit and the driver circuit.

13. The inverter of claim 12, wherein a first input of the OR gate is coupled to an output of the RS latch circuit and a second input of the OR gate is to receive the PWM signal.

14. An inverter system, comprising:
a first inverter to convert a direct current (DC) voltage to a first alternating current (AC) voltage; and
a second inverter to convert DC voltage to a second AC voltage, wherein the first inverter and the second inverter are coupled to each other and configured to operate in an opposite phase, such that an output of the inverter system comprises a summation of the first AC voltage and the second AC voltage,
wherein each of the first inverter and the second inverter comprises:
an inverter circuit configured to convert the DC voltage to an AC voltage;
a pulse width modulation (PWM) controller to generate a PWM signal;
a driver circuit coupled to the PWM controller and the inverter circuit to drive the inverter based on the PWM signal; and
a current limit circuit coupled the PWM controller, the driver circuit, and the inverter circuit to limit an output current of the inverter circuit to provide output overload and short circuit protection of the inverter circuit, wherein the current limit circuit comprises:
a current feedback circuit to generate a current feedback signal based on the PWM signal and the output current of the inverter circuit, and
a slope compensation circuit to generate a slope compensation signal based on the PWM signal and a predetermined current reference, wherein the driver circuit is configured to turn on or turn off the inverter circuit based on the current feedback signal and the slope compensation signal, such that the output current of the inverter is limited.

15. A current limit circuit of an inverter, comprising:
a current feedback circuit to generate a current feedback signal based on a pulse width modulation (PWM) signal received from a PWM controller and an output current of an inverter circuit configured to convert a DC voltage to an AC voltage;
a slope compensation circuit to generate a slope compensation signal based on the PWM signal and a predetermined current reference; and
a driver circuit configured to turn on or turn off the inverter circuit based on the current feedback signal and the slope compensation signal, wherein the current limit circuit is configured to limit the output current of the inverter circuit to provide output overload and short circuit protection of the inverter circuit.

16. The current limit circuit of claim 15, wherein the current feedback circuit comprises:
a current sense circuit coupled to an output of the inverter to sense the output current of the inverter; and
a ramp generator to generate a first ramp signal, wherein the current feedback signal is generated based on the sensed output current and the first ramp signal.

17. The current limit circuit of claim 16, wherein the current feedback circuit further comprises a first summation circuit to generate the current feedback signal by summing the sensed output current and the first ramp signal.

18. The current limit circuit of claim 15, wherein the slope compensation circuit comprises:
a current reference configured to provide the predetermined current reference; and
a second ramp generator to generate a second ramp signal, wherein the slope compensation signal is generated based on the current reference and the second ramp signal.

19. The current limit circuit of claim 18, wherein the slope compensation circuit further comprises a second summation circuit to generate the slope compensation signal by summing the current reference and the second ramp signal.

20. The current limit circuit of claim 15, wherein the current limit circuit further comprises a comparator coupled to the current feedback circuit and the slope compensation circuit to compare the current feedback signal and the slope compensation signal, wherein the driver circuit is configured to turn on or turn off the inverter circuit based on the comparison.

* * * * *